US010848251B2

(12) United States Patent
Yerramalli et al.

(10) Patent No.: US 10,848,251 B2
(45) Date of Patent: Nov. 24, 2020

(54) CHANNEL QUALITY MEASUREMENT IN UNLICENSED DEPLOYMENTS

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 16/001,155

(22) Filed: Jun. 6, 2018

(65) Prior Publication Data

US 2019/0020424 A1 Jan. 17, 2019

Related U.S. Application Data

(60) Provisional application No. 62/532,676, filed on Jul. 14, 2017.

(51) Int. Cl.
*H04B 17/309* (2015.01)
*H04B 1/713* (2011.01)
(Continued)

(52) U.S. Cl.
CPC .......... *H04B 17/309* (2015.01); *H04B 1/713* (2013.01); *H04W 16/14* (2013.01); *H04B 1/715* (2013.01); *H04W 24/08* (2013.01)

(58) Field of Classification Search
CPC ...... H04B 17/309; H04B 1/713; H04B 1/715; H04W 16/14; H04W 24/08
See application file for complete search history.

(56) References Cited

U.S. PATENT DOCUMENTS

2008/0267302 A1* 10/2008 Cai .................. H04B 17/309
375/260
2013/0322276 A1* 12/2013 Pelletier ............ H04W 72/0453
370/252
(Continued)

FOREIGN PATENT DOCUMENTS

WO 2016163819 A1 10/2016

OTHER PUBLICATIONS

International Search Report and Written Opinion—PCT/US2018/036484—ISA/EPO—dated Aug. 1, 2018.
(Continued)

*Primary Examiner* — Ajay Cattungal
(74) *Attorney, Agent, or Firm* — ArentFox/Qualcomm Inc.; Nerrie M. Zohn

(57) ABSTRACT

The extension of NB-IoT and eMTC communications into the unlicensed spectrum introduces a number of problems associated with channel quality measurement and reporting. A method, apparatus, and computer readable medium are presented that provide a technique for channel quality measurement and reporting that addressed such problems. A UE apparatus measures a CQI measurement for each of a plurality of groups of hopping frequencies, wherein a set of hopping frequencies is grouped into the plurality of groups and reports a CQI for each of the plurality of groups. A base station may configure the UE for CQI reporting and may receive a CQI for each of a plurality of groups of hopping frequencies, wherein a set of hopping frequencies is grouped into the plurality of groups. The set of hopping frequencies comprise frequencies in an unlicensed spectrum.

46 Claims, 12 Drawing Sheets

(51) Int. Cl.
  *H04W 16/14*   (2009.01)
  *H04B 1/715*   (2011.01)
  *H04W 24/08*   (2009.01)

(56) References Cited

U.S. PATENT DOCUMENTS

| | | | |
|---|---|---|---|
| 2014/0295865 A1* | 10/2014 | Fantaye | H04W 72/1226 455/450 |
| 2015/0223243 A1* | 8/2015 | Tabet | H04L 5/001 370/330 |
| 2016/0165466 A1* | 6/2016 | Kim | H04L 5/0057 370/252 |
| 2016/0323901 A1* | 11/2016 | Yum | H04W 72/085 |
| 2017/0231011 A1* | 8/2017 | Park | H04W 74/006 |
| 2017/0251464 A1* | 8/2017 | Mukherjee | H04W 72/14 |
| 2017/0289825 A1* | 10/2017 | Harrison | H04L 5/0057 |
| 2018/0069612 A1 | 3/2018 | Yum et al. | |
| 2018/0213429 A1* | 7/2018 | Zhang | H04W 24/02 |
| 2018/0288805 A1* | 10/2018 | Bhorkar | H04L 5/0048 |

OTHER PUBLICATIONS

LG Electronics: "Considerations on CSI for Low Complexity UEs," 3GPP Draft; R1-152706, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 24, 2015, XP050973973, 6 pages, Retrieved from the Internet: URL: http://www.3gpp.org/ftp/Meetings_3GPP_SYNC/RAN1/Docs/ [retrieved on May 24, 2015].

LG Electronics: "CSI Feedback for Low Complexity UEs," 3GPP Draft; R1-155372 CSI Feedback for Low Cost MTC, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Oct. 4, 2015, XP051039657, 4 pages, Retrieved from the Internet: URL: http://www.3gpp.org/ftp/Meetings_3GPP_SYNC/RAN1/Docs/ [retrieved on Oct. 4, 2015].

* cited by examiner

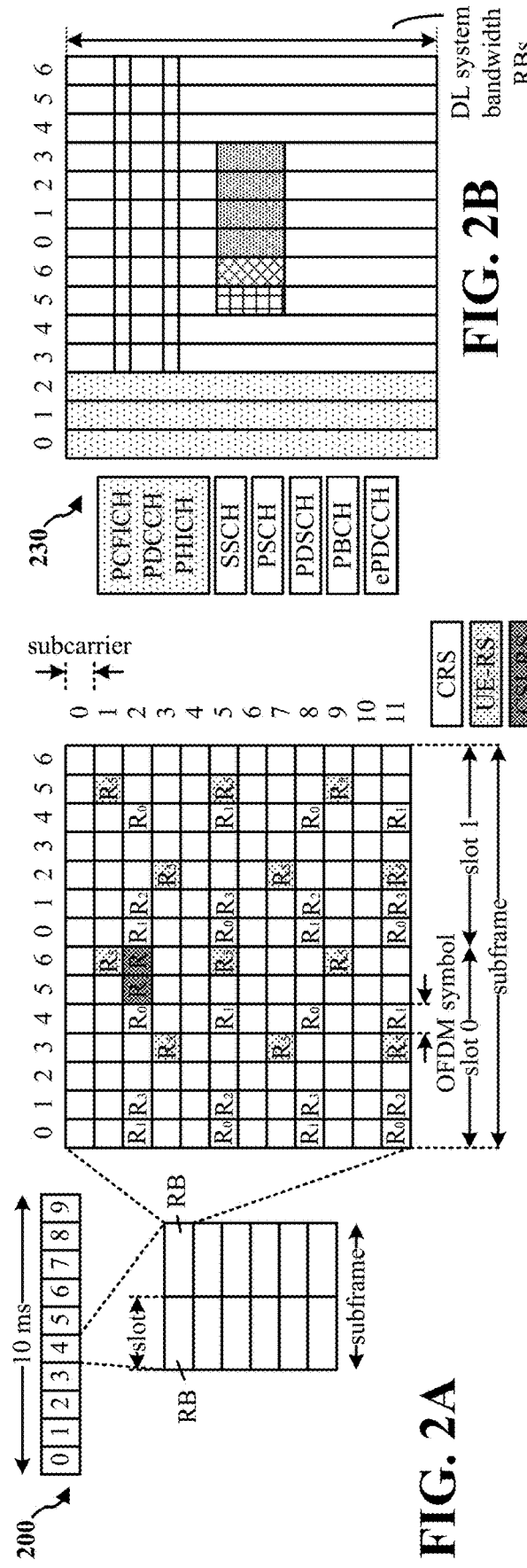
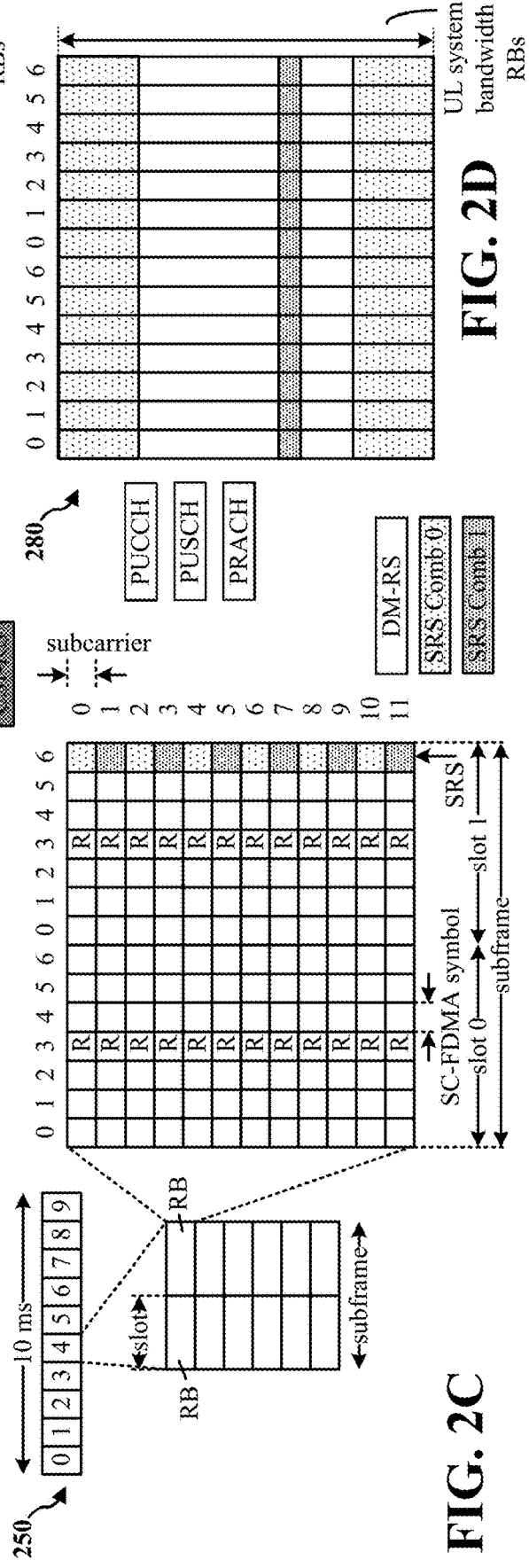
FIG. 2A  FIG. 2B  FIG. 2C  FIG. 2D

CHANNEL QUALITY MEASUREMENT IN UNLICENSED DEPLOYMENTS

CROSS-REFERENCE TO RELATED APPLICATION

This application claims the benefit of U.S. Provisional Application Ser. No. 62/532,676, entitled "Channel Quality Measurement in Unlicensed Deployments" and filed on Jul. 14, 2017, which is expressly incorporated by reference herein in its entirety.

BACKGROUND

Field

The present disclosure relates generally to communication systems, and more particularly, to measuring and reporting channel quality in narrow band communication in the unlicensed frequency band.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Narrowband communication provides a mechanism to implement low power communications. These narrowband communications are also being extended into the unlicensed spectrum. Narrowband communications involve communicating with a limited frequency bandwidth as compared to the frequency bandwidth used for LTE communications. One example of narrowband communication is narrowband (NB) internet-of-things (IoT) (NB-IoT) communication, which is limited to a single resource block (RB) of system bandwidth, e.g., 180 kHz. Another example of narrowband communication is enhanced machine-type communication (eMTC), which is limited to six RBs of system bandwidth.

The extension of NB-IoT and eMTC communications into the unlicensed spectrum introduces a number of problems associated with channel quality measurement and reporting for user equipment and base stations supporting eMTC and NB-IoT devices and other wireless devices that make use of the unlicensed spectrum. Accordingly, there exists a need for improved channel quality measurement and reporting mechanisms for base stations, e.g., supporting narrowband communication in unlicensed wireless device deployments.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In contrast to licensed LTE where the number of narrowbands is limited to 4 per UE, in unlicensed LTE eMTC (eMTC-U), a UE may be configured to monitor many more narrowbands, e.g., between 15 to 60 narrowbands. Due to this increased number of narrowbands, as well as other aspects of communication in the unlicensed spectrum, the UE may report measurement of a narrowband that can be many seconds old.

Additionally, in the unlicensed spectrum, there may be a significant amount of interference in specific isolated portions of the frequency band, in contrast with licensed LTE, where all the base stations follow a random hopping pattern across a wide spectrum and all channel occupants are known. If a UE is configured to report a wideband channel quality indicator (CQI), the wideband CQI will reflect an average that includes this high interference (low quality) measurement over the portion of the band along with the high quality measurement for the remaining narrowband. If the CQI in these colliding frequencies is averaged across other hop frequencies, then it can reduce system capacity due to the higher average interference across all monitored bands. Thus, wide-band measurements that function in the licensed spectrum may not work in an unlicensed spectrum due to channel occupancy in very specific regions of the unlicensed band.

Furthermore, frequency hopping is pseudo-random, so the interference in the current hop may not be correlated with the interference in the next hop.

Aspects presented herein include a method and apparatus for operating on an unlicensed or shared radio frequency spectrum band, providing opportunities for enhanced data transmission capacity, and also addressing the unique challenges in transmitting narrow band wireless communication. Specifically, the aspects include techniques for dividing a set of hopping frequencies into several groups and reporting CQI for each of these groups separately, e.g., as if it is a regular wideband CQI.

In an aspect of the disclosure, a method, a computer-readable medium, and an apparatus are provided. The apparatus may be a user equipment. The apparatus measures a CQI measurement for each of a plurality of groups of hopping frequencies, wherein a set of hopping frequencies is grouped into the plurality of groups and reports a CQI for each of the plurality of groups. The hopping frequencies may comprise frequencies in the unlicensed spectrum. The hopping frequencies within each group of the plurality of groups may be continuous in a hopping pattern order for the set of hopping frequencies and may be discontinuous in physical frequency.

In another aspect of the disclosure, a method, a computer-readable medium, and an apparatus are provided. The apparatus may be a base station. The apparatus configures a user equipment for CSI reporting and receives a CQI for each of a plurality of groups of hopping frequencies, wherein a set of hopping frequencies is grouped into the plurality of groups. The apparatus may group the set of hopping frequencies into the plurality of groups of hopping frequencies. The hopping frequencies may comprise frequencies in the unlicensed spectrum. The hopping frequencies within each group of the plurality of groups may be continuous in a hopping pattern order for the set of hopping frequencies and may be discontinuous in physical frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
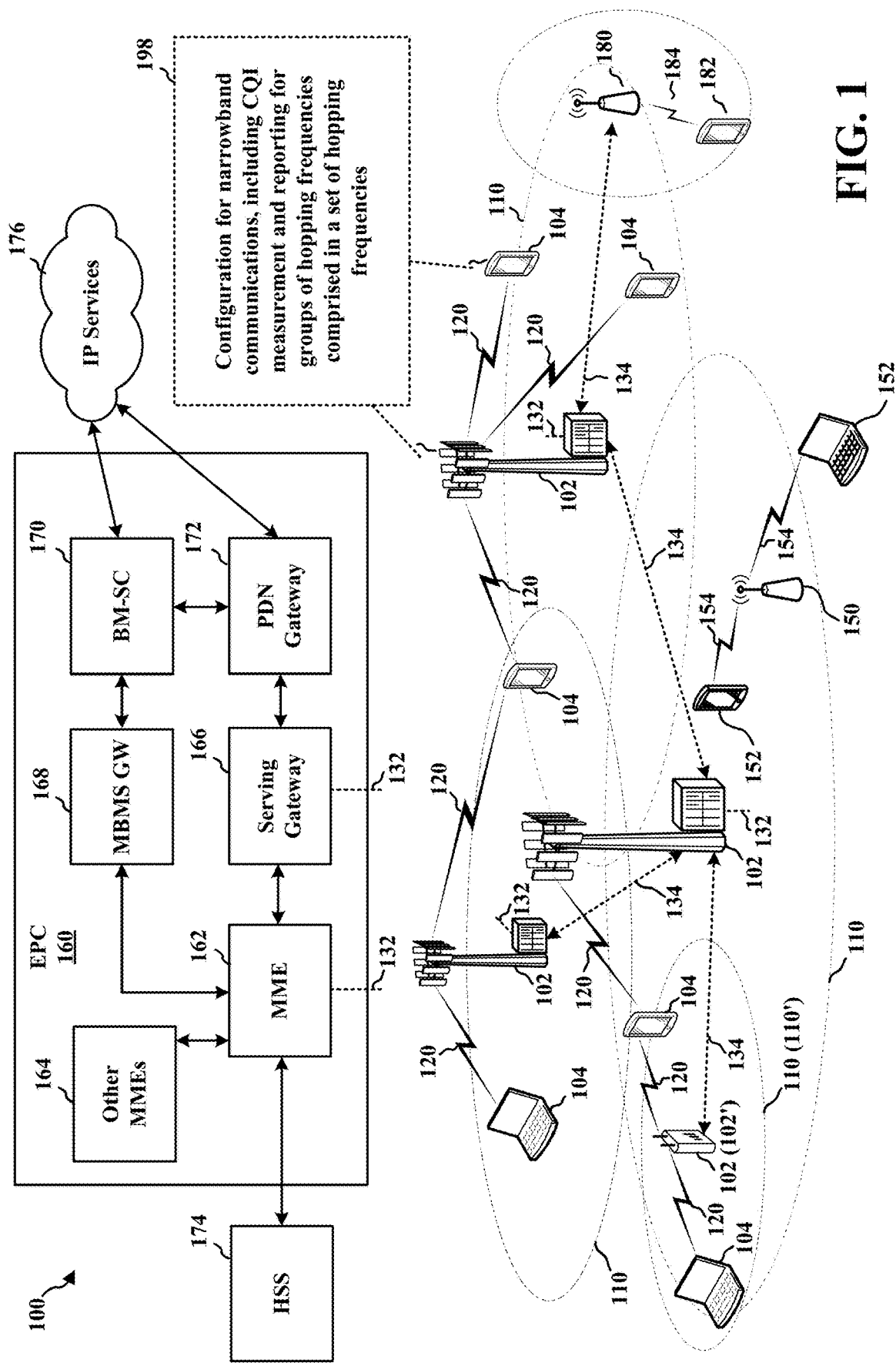
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The extension of NB-IoT and eMTC communications into the unlicensed spectrum introduces a number of problems associated with channel quality measurement and reporting for user equipment and base stations supporting eMTC and NB-IoT devices and other wireless device deployments (e.g., nearby Unlicensed LTE, Bluetooth, Wi-Fi, and ZigBee devices) that make use of the unlicensed spectrum. Accordingly, there exists a need for improved channel quality measurement and reporting mechanisms for base stations, e.g., supporting narrowband communication in unlicensed wireless device deployments.

In contrast to licensed LTE where the number of narrowbands is limited to 4 per UE, in unlicensed LTE eMTC (eMTC-U), a UE may be configured to monitor many more narrowbands, e.g., between 15 to 60 narrowbands. Due to this increased number of narrowbands, as well as other aspects of communication in the unlicensed spectrum, the UE may report measurement of a narrowband that can be many seconds old.

Additionally, in the unlicensed spectrum, there may be a significant amount of interference in specific isolated portions of the frequency band, in contrast with licensed LTE, where all the base stations 102 follow a random hopping pattern across a wide spectrum and all channel occupants are known. If a UE is configured to report a wideband CQI, the wideband CQI will reflect an average that includes this high interference (low quality) measurement over the portion of the band along with the high quality measurement for the remaining narrowband. If the CQI in these colliding frequencies is averaged across other hop frequencies, then it can reduce system capacity due to the higher average interference across all monitored bands. Thus, wide-band measurements that function in the licensed spectrum may not work in an unlicensed spectrum due to channel occupancy in very specific regions of the unlicensed band.

Furthermore, frequency hopping is pseudo-random, so the interference in the current hop may not be correlated with the interference in the next hop.

Aspects presented herein include a method and apparatus for operating on an unlicensed or shared radio frequency spectrum band, providing opportunities for enhanced data transmission capacity, and also addressing the unique challenges in transmitting narrow band wireless communication. Specifically, the aspects include techniques for dividing a set of hopping frequencies into several groups and reporting CQI for each of these groups separately, e.g., as if it is a regular wideband CQI.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The wireless communication system 100 may include communication 192 directly between UEs 104.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and base station 102 may be configured to support narrowband communications (198), including CQI measurement and reporting, over an unlicensed frequency spectrum. Furthermore, base station 102 may configure UE 104 for CQI reporting for each of a plurality of groups of hopping frequencies, as described herein. UE 104 may be configured to measure a CQI measurement for each of a plurality of groups of hopping frequencies, as described herein, wherein a set of hopping frequencies is grouped into the plurality of groups, and report a CQI for each of the plurality of groups.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
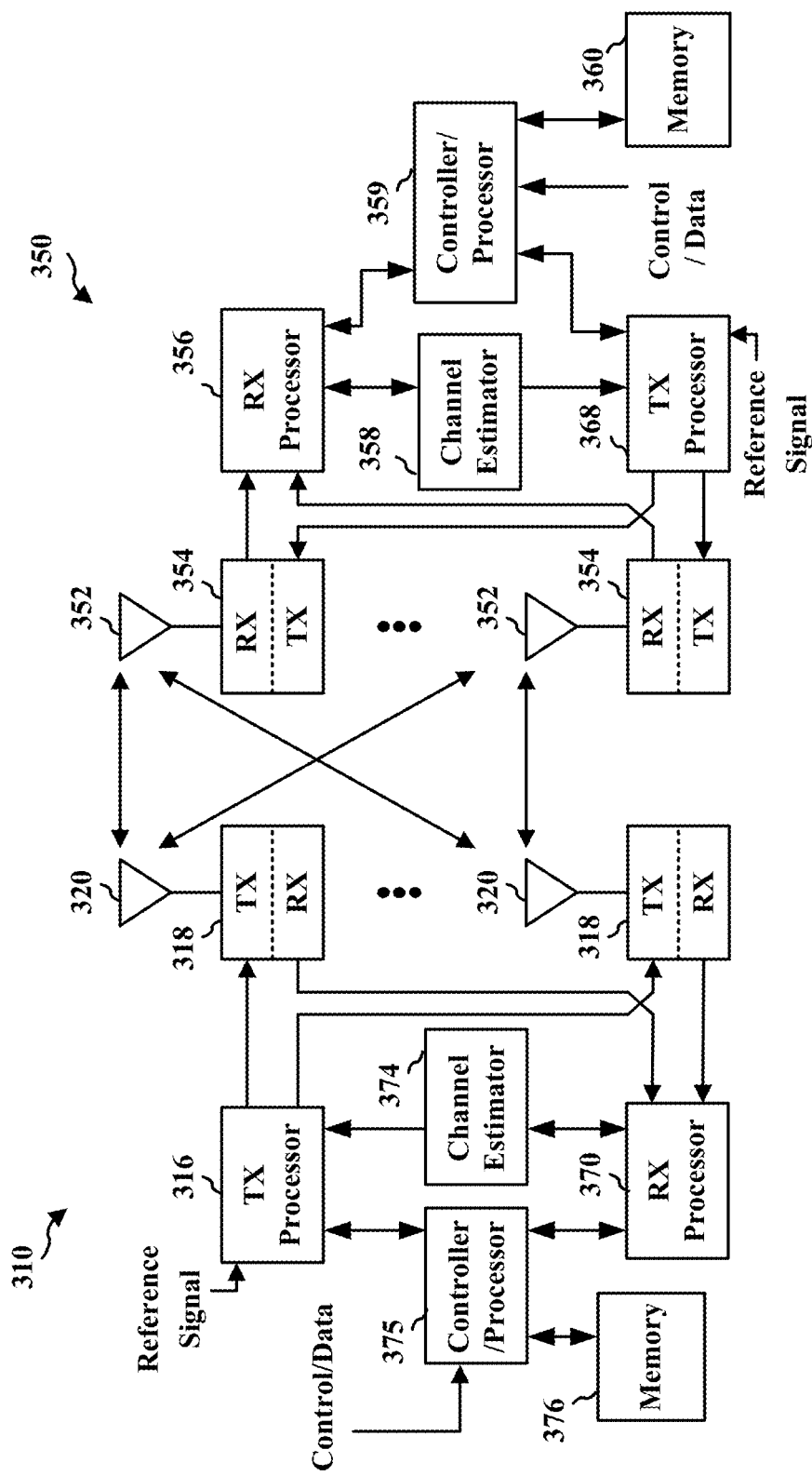
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband communications involve communicating with a limited frequency bandwidth as compared to the frequency bandwidth used for LTE communications. One example of narrowband communication is eMTC, which is limited to six RBs of system bandwidth. Another example of narrowband communication is NB-IoT communication, which is limited to a single RB of system bandwidth, e.g., 180 kHz.

NB-IoT communication and eMTC may reduce device complexity, enable multi-year battery life, and provide coverage to reach challenging locations such as deep inside buildings. However, because the coverage provided by narrowband communications may include challenging locations (e.g., a smart gas meter located in the basement of a building) there is an increased chance that one or more transmissions will not be properly received.

In LTE eMTC, the CSI measurement is performed on the narrow bands containing an MTC physical downlink control channel (MPDCCH). MPDCCH is a type of PDCCH designed for bandwidth-reduced operation targeted toward MTC devices, and includes information common for narrowband operation (e.g., common and UE-specific signaling, repetition level information).

In licensed spectrum LTE, a UE can be configured to monitor MPDCCH over a maximum of 4 narrowbands (each having six RBs of system bandwidth). Channel state information measurements may be performed on narrowbands configured to have MPDCCH. For example, given a 20 MHZ bandwidth, multiple 1 MHz narrowbands (e.g., 3-4 narrowbands may be configured). Each narrowband may have a width of six RBs, which is the default narrowband for MTC.

The base station 102 can configure a hopping pattern for the UE including multiple narrowbands. For example, a UE having been configured by the serving base station 102 to monitor 2 narrowbands with MPDCCH, may monitor M subframes in the first narrowband, then jump to the second narrowband. If a UE is configured to monitor more than two narrowbands, then the UE must be configured with a hopping pattern through which the UE cycles. The values for M and the hopping pattern may be configured by the base station or may be pre-determined, or a combination thereof.

A UE may monitor and measure channel state information (CSI) reference resources in the narrowbands configured to contain MPDCCH. If all narrowbands are configured to contain MPDCCH, then the UE will monitor CSI on all bands. Alternatively, if a subset narrowbands are configured to contain MPDCCH, then the UE will monitor CSI on the subset of narrowbands. Typically, if a UE is configured to follow a hopping pattern, the MPDCCH will also hop based on the hopping pattern over all the frequencies in the hopping pattern.

When measuring CSI, the UE may monitor all the RBs in the frequency domain (e.g., all six RBs). In the time domain, the UE will monitor for the last N subframes in each of the narrowbands on which MPDCCH is monitored, where N is defined by:

$$N = \text{ceil}(\text{csi-NumRepetitionCE}/\text{Number of narrowbands})$$

where csi-NumRepetitionCE is a value configured by the base station 102. For example, if the csi-NumRepetitionCE is set to 32, this is the number of subframes for which the UE will monitor CSI and maintain a record of the CSI. If the UE is configured to monitor only 1 narrowband, then the UE computes CSI based on the last 32 subframes in the narrowband. If the UE is configured to monitor 2 narrowband, then the UE computes CSI based on the last 16 subframes in each of the 2 narrowband for which the UE monitor MPDCCH. If the UE is configured to monitor 4 narrowband, then the UE computes CSI based on the last 8 subframes in each of the 4 narrowband for which the UE monitors MPDCCH.

For reporting a channel quality indicator (CQI), there are two different modes: period and aperiodic. Periodic CQI feedback includes mode 1-0 and mode 1-1. Aperiodic CQI feedback includes mode 2-0.

Mode 1-0 is a wideband CQI report. Reporting for mode 1-0 reflects transmission on all the narrow bands in the CSI reference resource. Therefore, if a UE is configured to monitor MPDCCH on 4 narrowband, then the UE will use measurements from reference signals in all 4 narrowbands to compute a common CQI and report the common CQI to the base station 102.

Similar to mode 1-0, mode 1-1 is also a wideband CQI. In mode 1-1, a UE reports one wideband CQI and one common precoding matrix (PMI) reflecting transmission on all the narrow bands in the CSI reference resource. Thus, when reporting CQI for mode 1-1, a UE will use measurements from reference signals in all monitored narrowbands to compute a common CQI and report the common CQI along with a precoding matric indicator (PMI). The PMI will identify a precoding matrix for the base station 102 to use for communications with the UE.

Mode 2-0 is a mode that includes UE selected sub-band feedback. In this mode, the UE reports wideband CQI and also reports a narrowband the UE measured as having the best channel quality. Thus, if the UE is monitoring CSI on 4 narrowband, it may select one narrowband and report the CQI for that narrowband, long with an indication identifying the selected narrowband. The base station 102 may make use of the reported narrowband when scheduling the UE in the future. As with modes 1-0, and 1-1, wideband CQI in mode 2-0 is calculated based on all monitored narrowband. When reporting the CQI of the selected narrowband, the value reflects measured CQI over only over the selected narrowband. This value is differentially encoded with respect to the wideband CQI.

In contrast to licensed LTE where the number of narrowbands is limited to 4 per UE, in unlicensed LTE eMTC (eMTC-U), a UE may be configured to monitor between 15 to 60 narrowbands in eMTC-U. Thus, as a base station 102 hops over 60 narrowband the served UE will also hop over the 60 narrowbands. Furthermore, in licensed LTE, the UE may spend a few ms per band then hop to another band.

However, since in unlicensed spectrum there is a need to perform listen-before-talk (LBT) procedures, devices will seek to utilize a longer transmission time. Therefore, depending on the employed frame structure, a base station 102 may spend 40 or 80 ms per narrowband before hopping. Given this delay and the large number of narrowband, it may take several seconds before a base station 102 cycles back to a given narrowband. Thus, a few seconds (e.g., up to 5 seconds) can pass between successive measurements of a channel. Furthermore, given the nature of LBT, the base station 102 may not transmit on some hop frequencies, thus the reference subframe that is actually used for computing the CQI could be several cycles old. This may be because the base station 102 does not transmit on a given cycle, because the UE does not decode the base station 102 transmission, or because UE ignores a transmission. This leads to the UE reporting a previous measurement of the narrowband which can be many seconds old.

In the unlicensed spectrum, there may be a significant amount of interference in specific isolated portions of the frequency band. This is in contrast with licensed LTE, where all the base stations 102 follow a random hopping pattern across a wide spectrum and all channel occupants are known. For example, if a Wi-Fi node is deployed in 2.40 to 2.42 GHz band and causing interference to a UE (e.g., because it is close to the UE), then the CQI measured would be different for the 2.40 to 2.42 GHz band hopping frequencies that overlap this part of the band versus those others that do not overlap this band. However, if UE is configured to report a wideband CQI, the wideband CQI will reflect an average that includes this high interference (low quality) measurement over a 2.40 to 2.42 GHz band along with the high quality measurement for the remaining narrowband. If the CQI in these colliding frequencies is averaged across other hop frequencies, then it can reduce system capacity due to the higher average interference across all monitored bands. Thus, wide-band measurements that function in the licensed spectrum may not work in an unlicensed spectrum due to channel occupancy in very specific regions of the unlicensed band.

Furthermore, frequency hopping is pseudo-random, so the interference in the current hop may not be correlated with the interference in the next hop. That is, as interference in the unlicensed band may be localized to a single narrowband or a few clustered narrowbands, the CSI measured at the current narrowband may not be predictive of interference on another narrowband. This problem is partly due to that fact that the frequency hopping has to be pseudo-random by regulation. For example, if a base station 102 is configured to use 60 narrowbands, the choice of hopping between the bands will follow an effectively random pattern. While there may be some benefit to looking at long term statistics to figure out how to schedule a UE, there is no reliable relationship between one hop or the next.

Aspects presented herein include a method and apparatus for operating on an unlicensed or shared radio frequency spectrum band, providing opportunities for enhanced data transmission capacity, and also addressing the unique challenges in transmitting narrow band wireless communication. Specifically, the aspects include techniques for dividing a set of hopping frequencies into several groups and reporting CQI for each of these groups separately, e.g., as if it is a regular wideband CQI.

Figure 5:
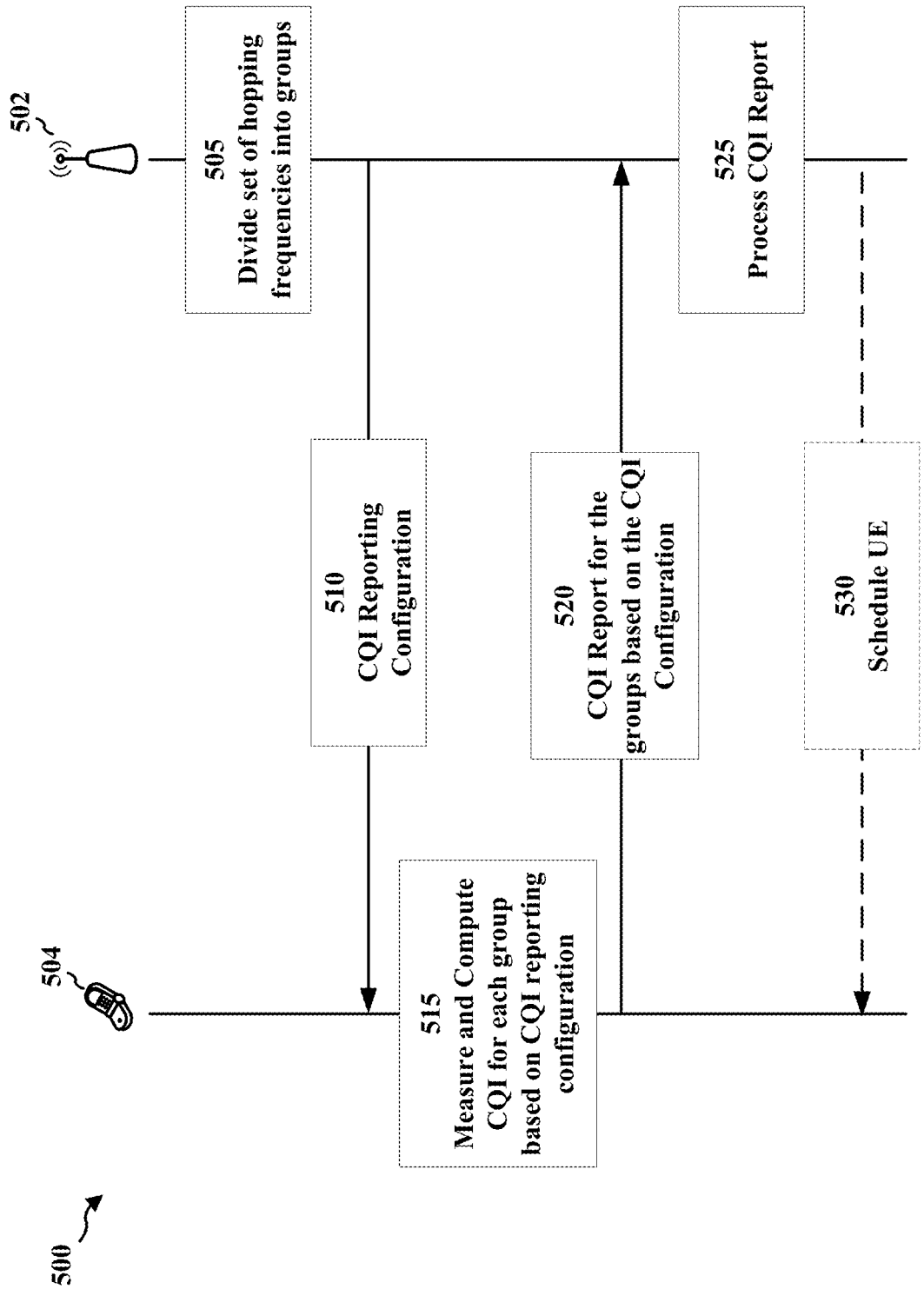
FIG. 5 is a diagram of wireless communication between a base station and UE.

FIG. 5 illustrates an exemplary aspect of a system 500 for wireless communication between a base station 502 (e.g., 102, 310), and UE 504 (e.g., 104, 350) including CQI measurement and reporting. System 500 illustrates an example where a set of hopping frequencies may be divided into several groups for CQI measurements and reporting.

Figure 4:
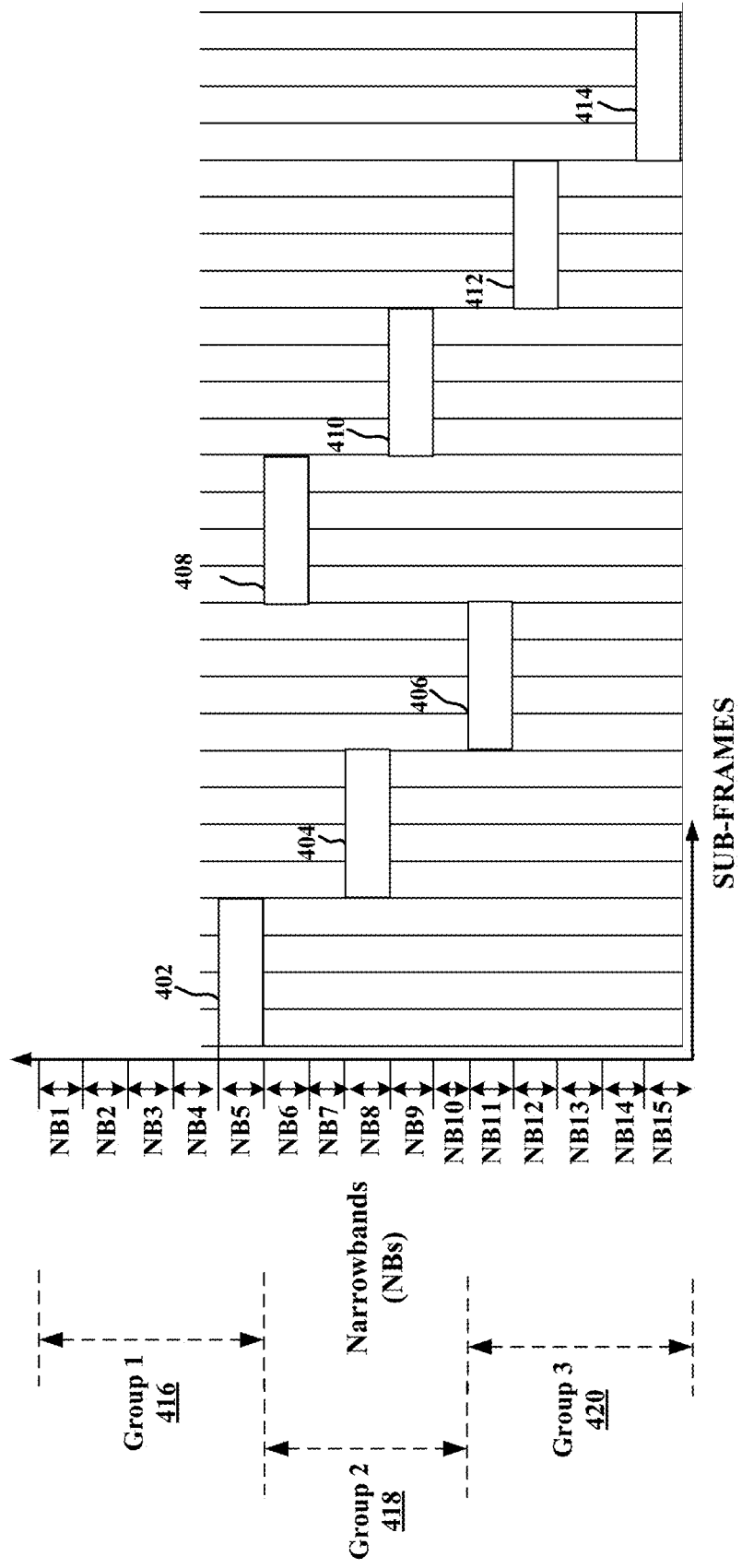
FIG. 4 illustrates a portion of a set of narrowband frequencies.

A set of hopping frequencies may be divided into several groups. For example, a set of 15 hopping frequencies may be divided into 3 groups of 5 frequencies. In another example, a set of 60 hopping frequencies may be divided into 10 groups of 6 frequencies. The set of hopping frequencies may be divided and grouped by the base station, for example. FIG. 5 illustrates, at step 505, base station 502 may determine a CQI reporting configuration, including a division of a set of hopping frequencies into groups. This information may be provided to the UE by the base station, e.g., at 510, the base station 502 may transmit a CQI reporting configuration to a UE 504. This configuration may be provided over RRC, SIBs, or may be transmitted along with CQI reporting request. CQI may be reported by the UE for each of these groups separately, e.g., as if the group were a regular wideband CQI. Such grouping and reporting may reduce the reporting load on the UE and the resources used for uplink reports at the base station. FIG. 4 illustrates a set of hopping frequencies comprising 15 narrowbands (e.g., NB1-NB15). The hopping pattern is illustrated as comprising a hop from NB5 at 402 to NB 8 at 404 to NB11 at 406. The hopping pattern continues to NB6 at 408, NB9 at 410, NB 12 at 412, and B15 at 414.

In a first option, each group of frequencies may be discontinuous in order of the hop set but may span a contiguous subset of physical frequencies. FIG. 4 illustrates an example grouping according to this first option, with Group 1 416 comprising NB 1-5, Group 2 418 comprising NB 6-10, and Group 3 420 comprising NB 11-15. The numbers of narrowbands within each group may be determined by the base station, groups of 5 narrowbands is merely an example. This option may lead to detection of interference at a portion of the frequency band, e.g., interference from a WiFi node that spans only 20 MHz out of the 80 MHz band. In one example, CQI reporting may be performed in the last frequency of the hop set in each group. In another example, CQI reporting may occur after a visit to the Nth hop frequency in the set, where N is configured by the base station or specified in the spec. The base station may receive some early warning about the interference level in the hop set, and may use the early warning to configure the CQI reporting.

Figure 12:
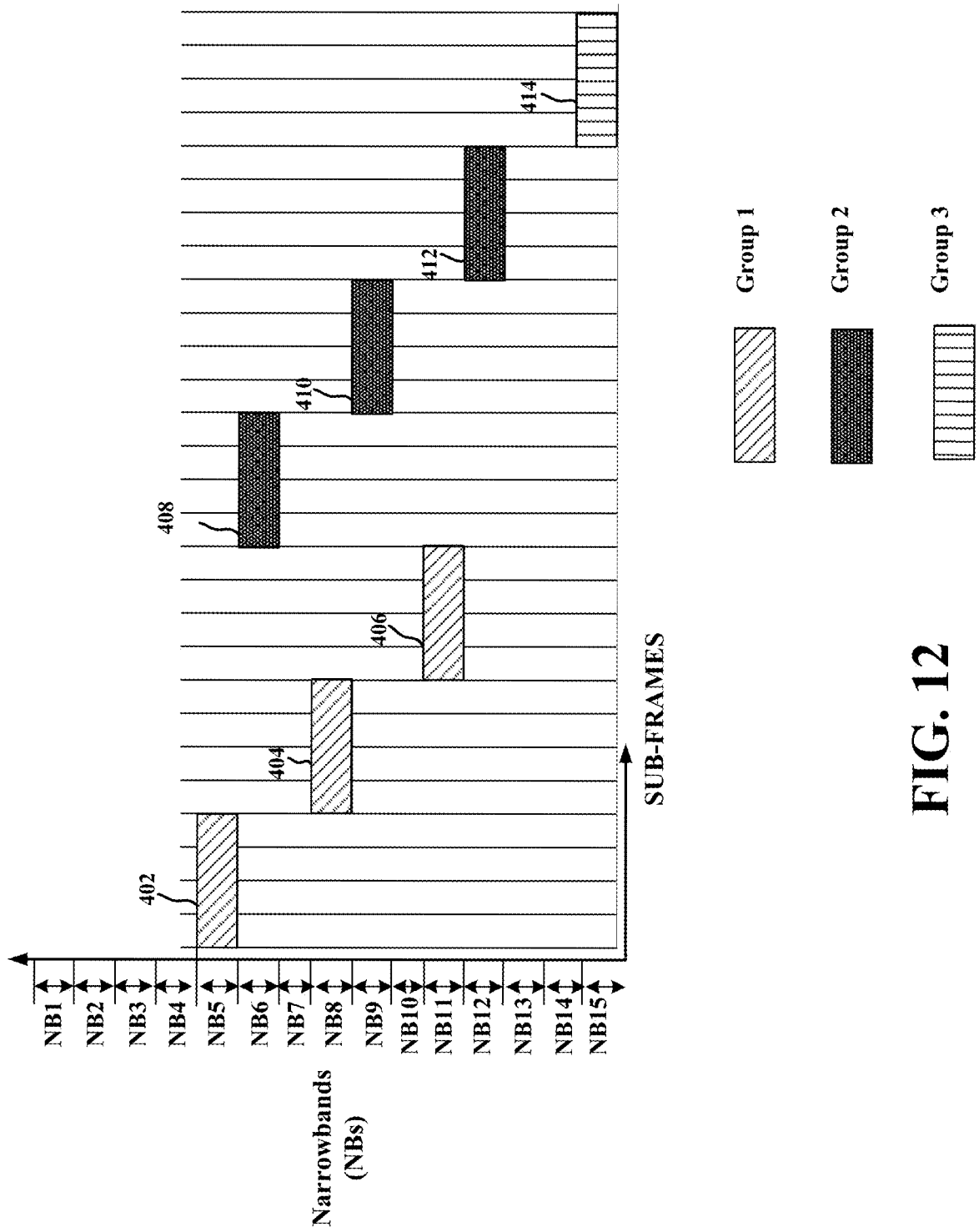
FIG. 12 illustrates groups of narrowband frequencies with a hopping pattern.

In a second option, each group of frequencies may be continuous in the hop set order but may be discontinuous in physical frequency. For example, in FIG. 4, a first group according to this second option may comprise NB5, NB8, and NB11, a second group may comprise NB6, NB9, and NB12. A third group may comprise NB15 and the following two hopping frequencies in the hopping pattern, and so forth. FIG. 12 illustrates the example hopping patterns from FIG. 4 with the grouping that is continuous in the hop set order yet discontinuous in frequency. Groups of three narrowbands is merely an example, and a different number of narrowbands may be used to group the narrowbands in the set of frequencies.

At 515, the UE 504 measures and computes CQI based on the reporting configuration transmitted by the eNB 502. Based on the configuration, the UE may compute and report separate CQI for the groups of frequencies in the frequency set.

At 520, the UE transmits the CQI report to the eNB 502. Any of a number of reporting configurations may be used by the UE to report the CQI. In a first option, a UE may report only a wideband CQI for each group of hopping frequencies in the set of hopping frequencies. In a second option, a UE may report a wideband CQI for each group of hopping frequencies and may also report a sub-band CQI per hop frequency or in a subset of hop frequencies within the groups. In a third option, a UE may report a wideband CQI for the entire hop set and may also report a group sub-band CQI based on the group configuration.

For any of these reporting options, the reporting configuration may be configured by the base station, e.g., at 510. For example, an RRC or SIB may be used to provide the UE with the corresponding configuration from the base station.

At 525 the base station 502 may process the CQI report, and may schedule the UE at 530, e.g., over its hopping pattern based on the results of the UE reporting.

A reference subframe may be used for computing a CQI for each group of hopping frequencies. In License Assisted Access (LAA) and MulteFire (MF), the reference subframe for CQI is the last valid subframe before the reporting instance. If the base station did not transmit for a long time, this leads to the issue that the CQI report would be based on very old base station transmissions. If there are no reference subframes available, e.g., if the cell was just activated etc., then a CQI 0 is reported.

Aspects presented herein provide a technique for avoiding the inclusion of older CQI reference subframes in CQI reporting. For example, when performing group CQI reporting, e.g., at 520, for groups of narrowbands within a set of frequencies, the UE may skip a frequency in which LBT fails for the purpose of computing wideband CQI within the corresponding group. By not including the failed frequency when computing a CQI, older CQI reference subframes do not contaminate the newly computed wideband CQI or group sub-band CQI. If the base station does not transmit on any of the frequencies within the group, then the UE may transmit CQI 0 or a default CQI value.

If the base station is a wideband base station (e.g., a base station having 4 narrowbands in 5 MHz), then a UE can opportunistically measure CQI in the other narrowbands within the base station's transmission in the downlink subframes where the UE is not required to monitor PDCCH or receive PDSCH.

In a first example, when the UE does not receive PDCCH or receives a PDCCH which does not schedule PDSCH, the UE may monitor other narrowbands within the eNB wideband in the remaining downlink subframes that are not part of the PDCCH search space.

In a second example, when the PDCCH search space is configured on multiple narrowbands within the wideband base station transmission or when PDSCH is scheduled to span multiple narrowbands, the UE may measure CQI on the PDCCH search space or the PDSCH subframes, e.g., if the transmission mode permits such measurement.

Another issue for CQI reporting may occur when a UE wakes up from DRX or transitions from an RRC idle state. When the number of narrowbands per UE is small, e.g., as in LTE eMTC, then it may be easier to compute wideband CQI by using the transmissions on all the narrowbands. However, for eMTC-U on the unlicensed spectrum where the number of hop frequencies, and thus narrowbands, may be large, the UE may not even visit all the frequencies before it has to transmit CQI. For example, for small packet transmissions, the UE may only visit a very small number of frequencies during a DRX ON period. Similarly, the UE may only visit a small number of frequencies when it transitions from RRC_idle to RRC_connected.

Aspects presented herein provide a solution to CQI reporting in these situations.

In a first option, if a wideband or a group sub-band CQI is configured, then the UE may use only the available reference subframes in the hop frequencies visited by the eNB after the current wakeup cycle to compute the needed CQI. Thus, the UE may not take into account the hop frequencies for which it has stale data or no data.

In a second option, the UE may perform an anchor channel based initialization. In this option, the UE may computer a wideband CQI on the anchor channel and a differential CQI can be reported for each hop frequency or group of hop frequencies. This may reduce the initial reporting requirements for the UE. Once the entire hop frequency set is completed, then the UE may switch to computing wideband CQI using the non-anchor reference subframes, e.g., to better reflect interference conditions.

In a third option, the UE may perform only anchor channel periodic or aperiodic based CQI reporting. For example, the UE may be configured to perform only anchor channel periodic or aperiodic based CQI reporting.

In a fourth option, the UE may report CQI based on the first narrowband or a first few narrowbands/hop frequencies that it monitors. The CQI on these initial narrowbands/hop frequencies that the UE monitors may be based on a default CQI configuration. In one example, CQI reporting in Msg 3 or Msg 5 of an RRC connection setup procedure may be based on a default CQI configuration. The base station may use this initial CQI to schedule transmissions until the first full CQI is available from the UE.

Figure 6:
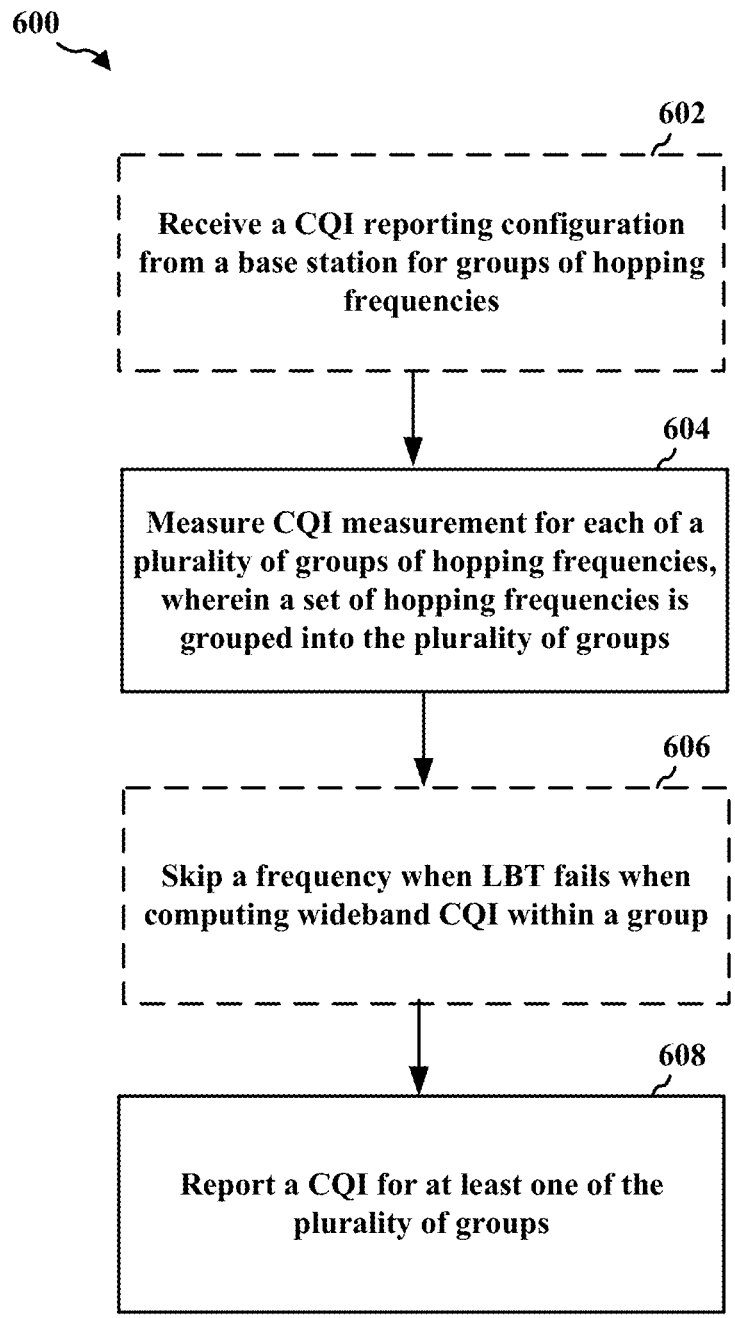
FIG. 6 is a flowchart of a method of wireless communication.

FIG. 6 is a flowchart 600 of a method of wireless communication, including measuring channel quality. The method may be performed by a user equipment (e.g., UE 104, 350, 504, the apparatus 702, 702'). Optional aspects are illustrated using a dashed line.

At 604, the UE measures a CQI measurement for each of a plurality of groups of hopping frequencies, wherein a set of hopping frequencies is grouped into the plurality of groups. The set of hopping frequencies may comprise frequencies in an unlicensed spectrum.

In one example, the hopping frequencies within each group of the plurality of groups may be continuous in a hopping pattern order for the set of hopping frequencies, as illustrated in the example of FIG. 12. The hopping frequencies within each group of the plurality of groups may be discontinuous in physical frequency.

In another example, the hopping frequencies within each group of the plurality of groups may span a contiguous subset of physical frequencies, as described in connection with the example of FIG. 4. The hopping frequencies within each group of the plurality of groups may be discontinuous in a hopping pattern order for the set of hopping frequencies.

The CQI measurement at 604 may be measured in a narrowband within a transmission band of a base station and outside a downlink control channel search space, when the user equipment does not receive a downlink control channel or receives a downlink control channel which does not schedule a downlink data transmission.

The CQI measurement at 604 may be measured on a downlink data channel when a downlink control channel search space is configured on multiple narrowbands within a transmission band of a base station or when the downlink data channel is scheduled to span multiple narrowbands.

At 608, the UE reports a CQI for each of the plurality of groups. In one example, the CQI may be reported, e.g., based on a last frequency in the hopping pattern within each of the plurality of groups. In another example, a timing for reporting the CQI for each group may be based on a configured number of hops in the hopping pattern within each of the plurality of groups.

In a first example, a wideband CQI may be reported for each of the plurality of groups. A wideband CQI for a particular group may comprise a CQI value based on all measured hopping frequencies of a given group in the at least one group of the plurality of groups. In a second example, a wideband CQI may be reported for each of the plurality of groups, e.g., a single CQI value based on all measured hopping frequencies in the group, and a sub-band CQI may be reported for a subset of hop frequencies within each group of the plurality of groups. A sub-band CQI may comprise a CQI value for a subset of hop frequencies within a group of hopping frequencies. In a third example, a wideband CQI may be reported for the set of hopping frequencies and a group sub-band CQI may be reported for each group of the plurality of groups. A wideband CQI for the set of hopping frequencies may comprise a CQI value based on all measured hopping frequencies in the set of hopping frequencies. A group-subband CQI may comprise a CQI value based on all measured hopping frequencies of a given group The UE may receive a CQI reporting configuration from a base station, e.g., at 602, wherein the UE reports the CQI for each of the plurality of groups based on the CQI reporting configuration received from the base station.

As illustrated at 606, the UE may skip a frequency in which a listen before talk procedure fails when computing a wideband CQI (e.g., a CQI value based on all measured hopping frequencies in the group) within a corresponding group of the plurality of groups.

The UE may report the CQI for measurements taken at hop frequencies within a current wake cycle.

The UE may report a wideband CQI for an anchor channel and a differential CQI for each of the plurality of groups, when the user equipment wakes up from a discontinuous reception mode or an idle mode.

The UE may report a wideband CQI for an anchor channel when the user equipment wakes up from a discontinuous reception mode or an idle mode.

The UE may report a partial CQI for an initial subset of hopping frequencies when the user equipment wakes up from a discontinuous reception mode or an idle mode and prior to reporting the CQI for each of the plurality of groups.

Figure 7:
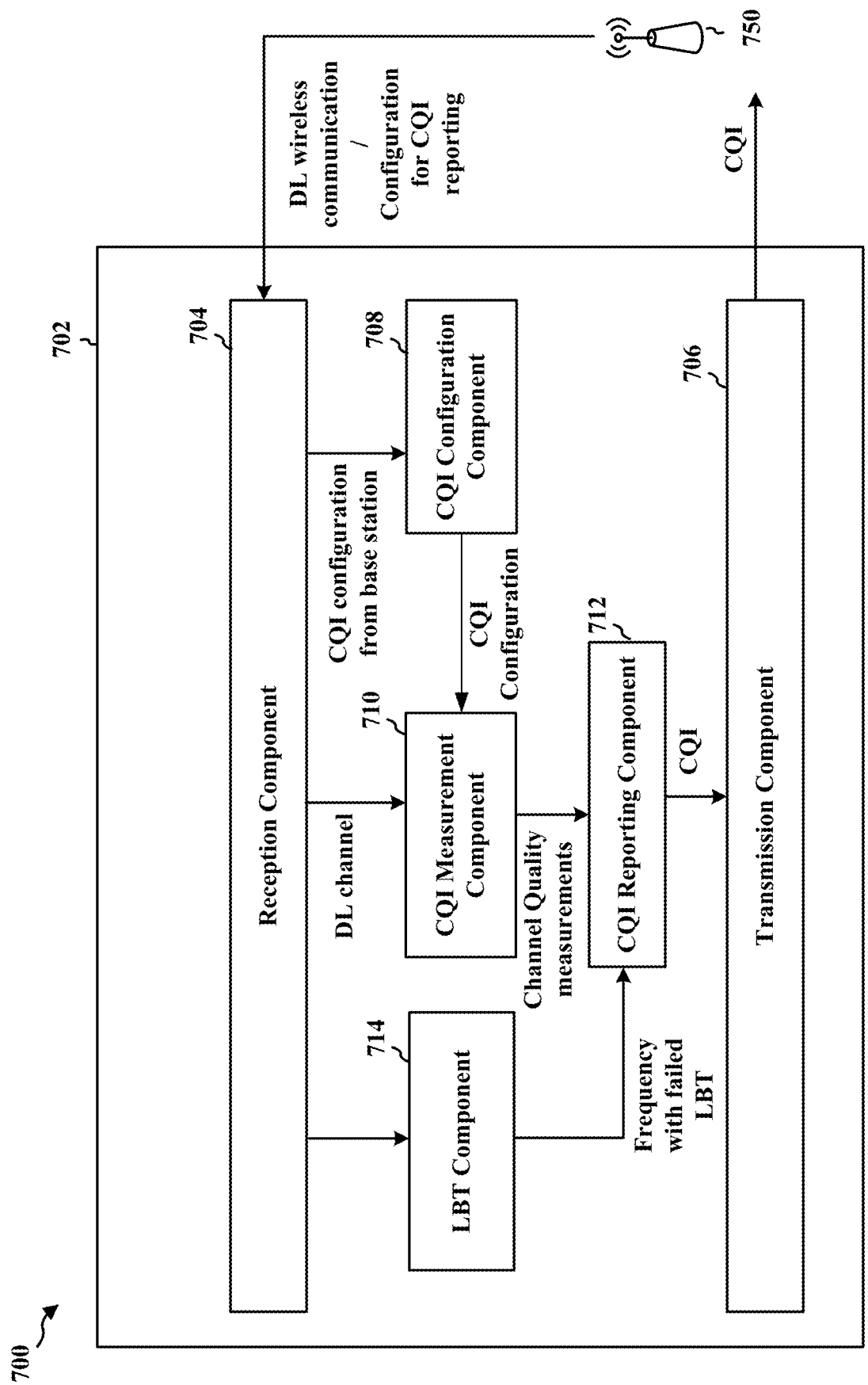
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., UE 104, 350, 504, 1050). The apparatus includes a reception component 704 that receives downlink communication from base station 750, a transmission component 706 that transmits uplink communication, including CQI to the base station 750. The apparatus may include a CQI measurement component 710 configured to measure a CQI measurement for each of a plurality of groups of hopping frequencies, a CQI reporting component 712 configured to report a CQI for at least one of the plurality of groups, a CQI Configuration Component 708 configured to receive a CQI reporting configuration from a base station, and an LBT Component 714 configured to skip a frequency in which a listen before talk procedure fails when computing a wideband CQI within a corresponding group of the plurality of groups.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
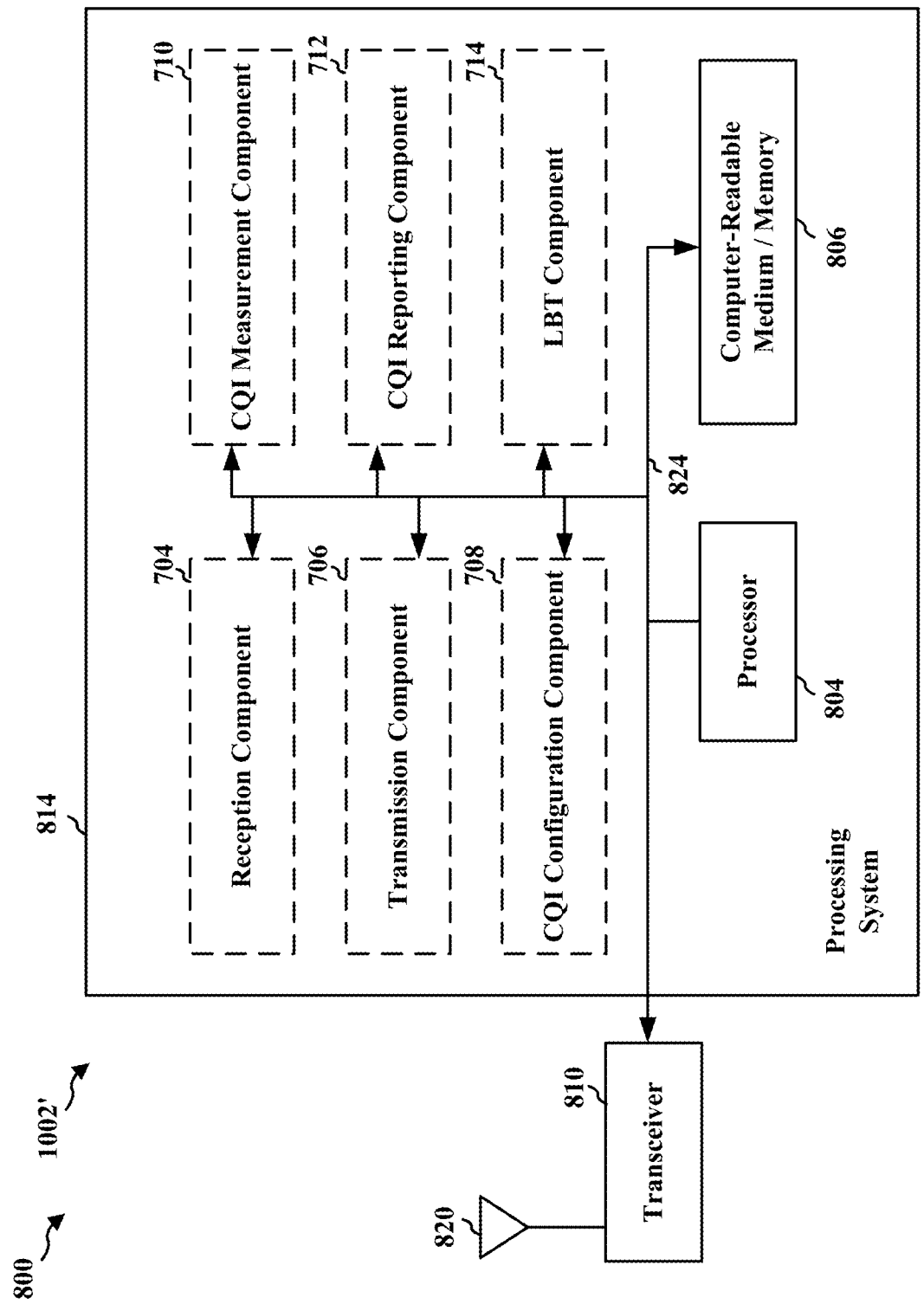
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for measuring a CQI measurement for each of a plurality of groups of hopping frequencies, means for reporting a CQI for each of the plurality of groups, means for receiving a CQI reporting configuration from a base station, and means for skipping a frequency in which a listen before talk procedure fails when computing a wideband CQI within a corresponding group of the plurality of groups. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
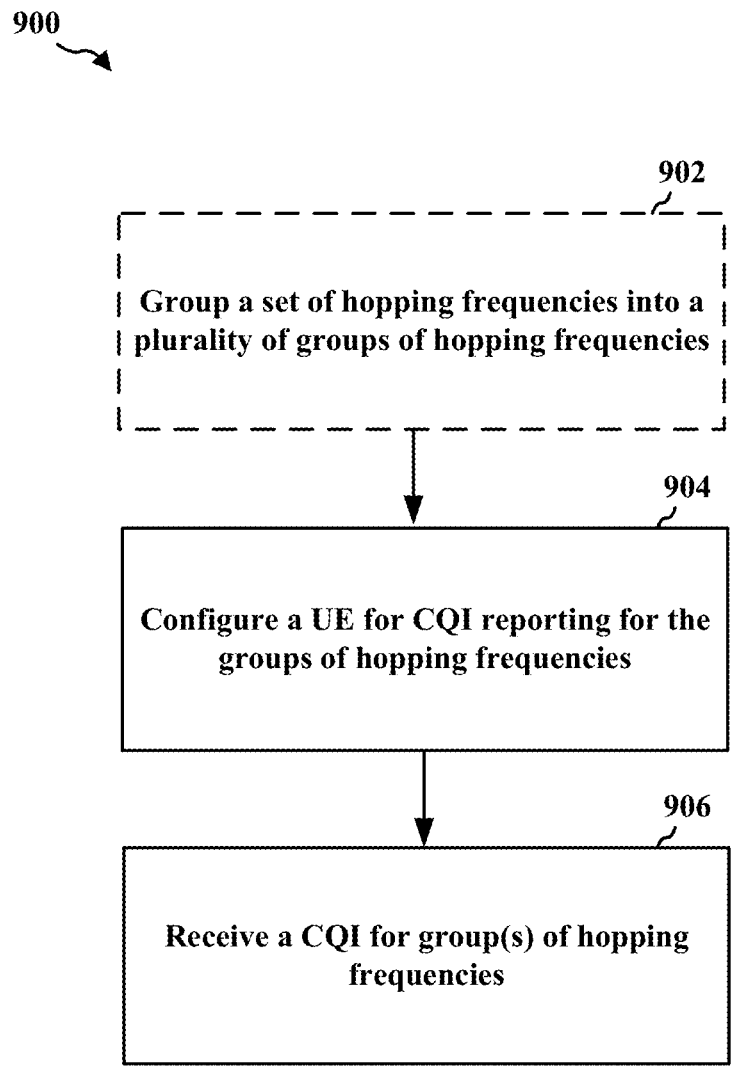
FIG. 9 is a flowchart of a method of wireless communication.

FIG. 9 is a flowchart 900 of a method of wireless communication, including measuring channel quality. The method may be performed by a base station (e.g., base station 102, 310, 502, the apparatus 1002, 1002'). Optional aspects are illustrated using a dashed line.

At 904, the base station configures a UE (e.g., UE 104, 350, 504, the apparatus 702, 702') for CQI reporting for a plurality of groups of hopping frequencies. As illustrated at 902, the base station may group the set of hopping frequencies into the plurality of groups of hopping frequencies prior to configuring the UE for the CQI reporting.

The set of hopping frequencies may comprise frequencies in an unlicensed spectrum.

In one example, the hopping frequencies within each group of the plurality of groups may be continuous in a hopping pattern order for the set of hopping frequencies. The hopping frequencies within each group of the plurality of groups may be discontinuous in physical frequency.

In another example, the hopping frequencies within each group of the plurality of groups may span a contiguous subset of physical frequencies. The hopping frequencies within each group of the plurality of groups may be discontinuous in a hopping pattern order for the set of hopping frequencies.

At 906, the base station receives a CQI for at least one group of the plurality of groups of hopping frequencies, wherein a set of hopping frequencies is grouped into the plurality of groups.

The reported CQI may be measured in a narrowband within a transmission band of a base station and outside a downlink control channel search space, when the user equipment does not receive a downlink control channel or receives a downlink control channel which does not schedule a downlink data transmission.

The reported CQI may be measured on a downlink data channel when a downlink control channel search space is configured on multiple narrowbands within a transmission band of a base station or when the downlink data channel is scheduled to span multiple narrowbands.

In an aspect, the reported CQI may be based on a last frequency in the hopping pattern within each of the plurality of groups. In another aspect, a timing for reporting the CQI for each group may be based on a configured number of hops in the hopping pattern within each of the plurality of groups.

In a first example, the reported CQI may comprise a wideband CQI for each of the plurality of groups. For example, a wideband CQI for the at least one group of the plurality of groups may comprise a CQI value based on all measured hopping frequencies of a given group in the at least one group of the plurality of groups. In a second example, the reported CQI may comprise a wideband CQI, e.g., a single CQI value based on all measured hopping frequencies in the group, for each of the plurality of groups and a sub-band CQI may be reported for a subset of hop frequencies within each group of the plurality of groups. Thus, a sub-band CQI may comprise a CQI value for a subset of hop frequencies within a group from among the plurality of groups of hopping frequencies. In a third example, the reported CQI may comprise a wideband CQI for the set of hopping frequencies and a group sub-band CQI may be reported for each group of the plurality of groups. A wideband CQI for the set of hopping frequencies may comprise a CQI value based on all measured hopping frequencies in the set of hopping frequencies. A group-subband CQI may comprise a CQI value based on all measured hopping frequencies of a given group The reported CQI may be based on CQI for measurements taken at hop frequencies within a current wake cycle.

The reported CQI may comprise a wideband CQI for an anchor channel and a differential CQI for each of the plurality of groups, e.g., when the user equipment wakes up from a discontinuous reception mode or an idle mode. The wideband CQI for the anchor channel may comprise a CQI for the frequency range of the anchor channel.

The reported CQI may comprise a wideband CQI for an anchor channel, e.g., when the user equipment wakes up from a discontinuous reception mode or an idle mode.

The reported CQI may comprise a partial CQI for an initial subset of hopping frequencies, e.g., when the user equipment wakes up from a discontinuous reception mode or an idle mode and until the user equipment is able to report a first full CQI.

Figure 10:
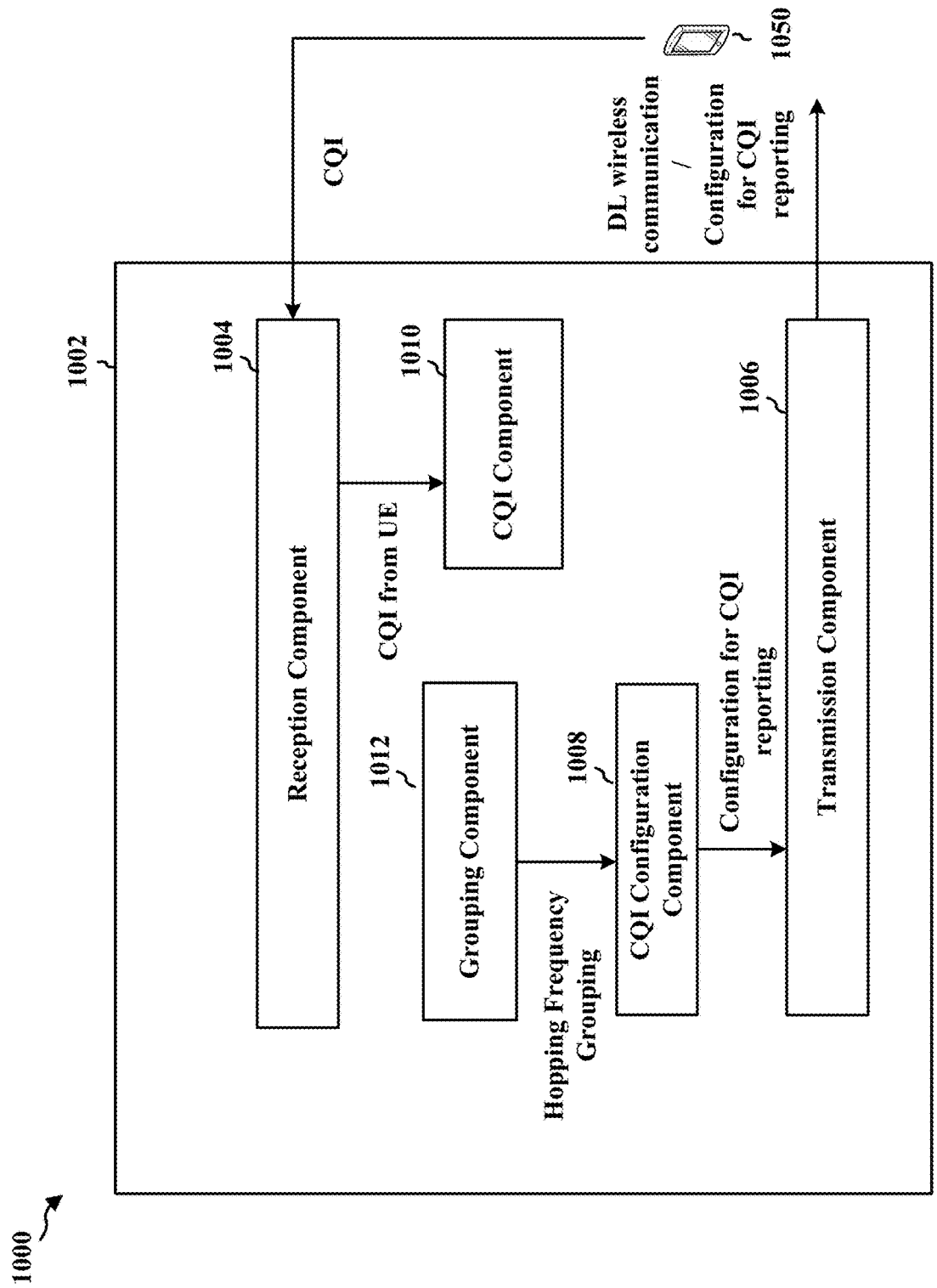
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station (e.g., base station 102, 310, 502, 750). The apparatus includes a reception component 1004 that receives uplink communication from at least one UE 1050, including channel quality indications, and a transmission component 1006 that transmits downlink communication to the UE 1050. The apparatus may include a CQI configuration component 1008 configured to configure UE 1050 for CQI reporting for a plurality of groups of hopping frequencies and a CQI component 1010 configured to receive a CQI for at least one group of the plurality of groups of hopping frequencies, wherein a set of hopping frequencies is grouped into the plurality of groups, e.g., as described in connection with FIGS. 5 and 9. The apparatus may include a grouping component 1012 configured to group the set of hopping frequencies into the plurality of groups of hopping frequencies.

The apparatus may include additional components that perform each of the blocks of the algorithm in the aforementioned flowcharts of FIGS. 5 and 9. As such, each block in the aforementioned flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
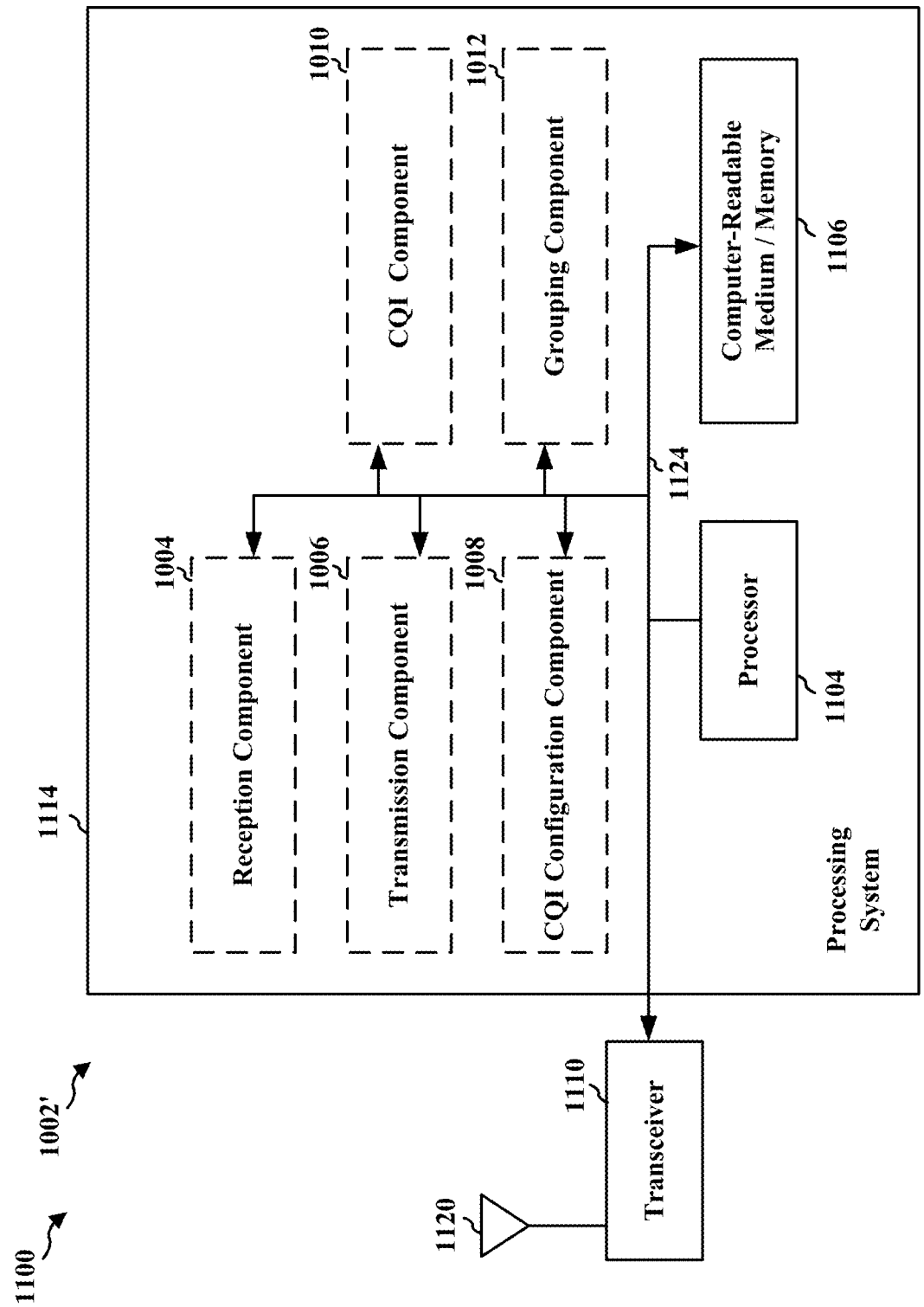
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for configuring a user equipment for CQI reporting for a plurality of groups of hopping frequencies, means for receiving a CQI for each of a plurality of groups of hopping frequencies, wherein a set of hopping frequencies is grouped into the plurality of groups, and means for grouping the set of hopping frequencies into the plurality of groups of hopping frequencies. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method performed at a user equipment (UE) for measuring channel quality, comprising:
    measuring a channel quality indicator (CQI) measurement for each of a plurality of groups of hopping frequencies, wherein a set of hopping frequencies comprising frequencies in an unlicensed spectrum is grouped into the plurality of groups; and
    reporting a wideband CQI for each of the plurality of groups and a sub-band CQI for at least a subset of hopping frequencies within at least one of the plurality of groups.

2. The method of claim 1, wherein hopping frequencies within each group of the plurality of groups are continuous in a hopping pattern order for the set of hopping frequencies.

3. The method of claim 2, wherein hopping frequencies within each group of the plurality of groups are discontinuous in physical frequency.

4. The method of claim 1, wherein reporting the CQI for the at least one of the plurality of groups includes reporting a CQI value based on all measured hopping frequencies of a given group in the at least one of the plurality of groups.

5. The method of claim 1, further comprising:
    skipping a frequency in which a listen before talk procedure fails when computing a wideband CQI within a corresponding group of the plurality of groups.

6. The method of claim 1, wherein the CQI reported for each of the plurality of groups comprises an aperiodic CQI.

7. The method of claim 1, further comprising:
    receiving a CQI reporting configuration from a base station, wherein the UE reports the CQI for each of the plurality of groups based on the CQI reporting configuration received from the base station.

8. The method of claim 1, wherein hopping frequencies within each group of the plurality of groups span a contiguous subset of physical frequencies.

9. The method of claim 8, wherein the CQI is reported based on a last frequency in a hopping pattern within each of the plurality of groups.

10. The method of claim 8, wherein a timing for reporting the CQI for each group is based on a configured number of hops in a hopping pattern within each of the plurality of groups.

11. The method of claim 1, wherein a group sub-band CQI is reported for each group of the plurality of groups.

12. The method of claim 1, wherein the CQI measurement is measured in a narrowband within a transmission band of a base station and outside a downlink control channel search space, when the UE does not receive a downlink control channel or receives the downlink control channel that does not schedule a downlink data transmission.

13. The method of claim 1, wherein the CQI measurement is measured on a downlink data channel when a downlink control channel search space is configured on multiple narrowbands within a transmission band of a base station or when the downlink data channel is scheduled to span multiple narrowbands.

14. The method of claim 1, wherein the user equipment reports the CQI for measurements taken at hop frequencies within a current wake cycle.

15. The method of claim 1, wherein the user equipment reports a wideband CQI for an anchor channel when the user equipment wakes up from a discontinuous reception mode or an idle mode.

16. The method of claim 1, wherein the user equipment reports a partial CQI for an initial subset of hopping frequencies when the user equipment wakes up from a discontinuous reception mode or an idle mode and prior to reporting the CQI for each of the plurality of groups.

17. An apparatus for measuring channel quality at a User Equipment (UE), comprising:
means for measuring a channel quality indicator (CQI) measurement for each of a plurality of groups of hopping frequencies, wherein a set of hopping frequencies comprising frequencies in an unlicensed spectrum is grouped into the plurality of groups; and
means for reporting a wideband CQI for each of the plurality of groups and a sub-band CQI for at least a subset of hopping frequencies within at least one of the plurality of groups.

18. The apparatus of claim 17, further comprising:
means for skipping a frequency in which a listen before talk procedure fails when computing a wideband CQI within a corresponding group of the plurality of groups.

19. The apparatus of claim 17, further comprising:
means for receiving a CQI reporting configuration from a base station, wherein the UE reports the CQI for each of the plurality of groups based on the CQI reporting configuration received from the base station.

20. An apparatus for measuring channel quality at a User Equipment (UE), comprising:
a memory; and
at least one processor coupled to the memory and configured to:
measure a channel quality indicator (CQI) measurement for each of a plurality of groups of hopping frequencies, wherein a set of hopping frequencies comprising frequencies in an unlicensed spectrum is grouped into the plurality of groups; and
report a wideband CQI for each of the plurality of groups and a sub-band CQI for at least a subset of hopping frequencies within at least one of the plurality of groups.

21. The apparatus of claim 20, wherein hopping frequencies within each group of the plurality of groups are continuous in a hopping pattern order for the set of hopping frequencies.

22. The apparatus of claim 21, wherein hopping frequencies within each group of the plurality of groups are discontinuous in physical frequency.

23. The apparatus of claim 20, wherein reporting the CQI for the at least one of the plurality of groups includes reporting a CQI value based on all measured hopping frequencies of a given group in the at least one of the plurality of groups.

24. The apparatus of claim 20, wherein the at least one processor is further configured to:
skip a frequency in which a listen before talk procedure fails when computing a wideband CQI within a corresponding group of the plurality of groups.

25. The apparatus of claim 20, wherein the at least one processor is further configured to:
receive a CQI reporting configuration from a base station, wherein the UE reports the CQI for each of the plurality of groups based on the CQI reporting configuration received from the base station.

26. A non-transitory computer-readable medium storing computer executable code for measuring channel quality at a User Equipment (UE), comprising code to:
measure a channel quality indicator (CQI) measurement for each of a plurality of groups of hopping frequencies, wherein a set of hopping frequencies comprising frequencies in an unlicensed spectrum is grouped into the plurality of groups; and
report a wideband CQI for each of the plurality of groups and a sub-band CQI for at least a subset of hopping frequencies within at least one of the plurality of groups.

27. The non-transitory computer-readable medium of claim 26, further comprising code to:
skip a frequency in which a listen before talk procedure fails when computing a wideband CQI within a corresponding group of the plurality of groups.

28. The non-transitory computer-readable medium of claim 26, further comprising code to:
receive a CQI reporting configuration from a base station, wherein the UE reports the CQI for each of the plurality of groups based on the CQI reporting configuration received from the base station.

29. A method performed at a base station for measuring channel quality, comprising:
configuring a user equipment (UE) for channel quality indicator (CQI) reporting for a plurality of groups of hopping frequencies;
receiving a wideband CQI for each group of the plurality of groups of hopping frequencies and a sub-band CQI for at least a subset of hopping frequencies within at least one of the plurality of groups; and
wherein a set of hopping frequencies comprising frequencies in an unlicensed spectrum is grouped into the plurality of groups.

30. The method of claim 29, further comprising:
grouping the set of hopping frequencies into the plurality of groups of hopping frequencies prior to configuring the UE for the CQI reporting.

31. The method of claim 29, wherein hopping frequencies within each of the plurality of groups are continuous in a hopping pattern order for the set of hopping frequencies.

32. The method of claim 31, wherein the hopping frequencies within each of the plurality of groups are discontinuous in physical frequency.

33. The method of claim 29, wherein the CQI for the at least one group of the plurality of groups comprises a CQI value based on all measured hopping frequencies of a given group in the at least one group of the plurality of groups.

34. The method of claim 29, wherein the CQI reported for each group of the plurality of groups comprises an aperiodic CQI.

35. The method of claim 29, wherein hopping frequencies within each group of the plurality of groups span a contiguous subset of physical frequencies.

36. The method of claim 35, wherein the hopping frequencies within each group of the plurality of groups are discontinuous in a hopping pattern order for the set of hopping frequencies.

37. The method of claim 36, wherein a timing for reporting the CQI for each group is based on a configured number of hops in the hopping pattern within each group of the plurality of groups.

38. An apparatus for wireless communication at a base station, comprising:
- means for configuring a user equipment (UE) for channel quality indicator (CQI) reporting for a plurality of groups of hopping frequencies;
- means for receiving a wideband CQI for each group of the plurality of groups of hopping frequencies and a sub-band CQI for at least a subset of hopping frequencies within at least one of the plurality of groups; and
- wherein a set of hopping frequencies comprising frequencies in an unlicensed spectrum is grouped into the plurality of groups.

39. The apparatus of claim 38, further comprising:
- means for grouping the set of hopping frequencies into the plurality of groups of hopping frequencies prior to configuring the UE for the CQI reporting.

40. An apparatus for wireless communication at a base station, comprising:
- a memory; and
- at least one processor coupled to the memory and configured to:
  - configure a user equipment (UE) for channel quality indicator (CQI) reporting for a plurality of groups of hopping frequencies;
  - receive a wideband CQI for each group of the plurality of groups of hopping frequencies and a sub-band CQI for at least a subset of hopping frequencies within at least one of the plurality of groups; and
  - wherein a set of hopping frequencies comprising frequencies in an unlicensed spectrum is grouped into the plurality of groups.

41. The apparatus of claim 40, wherein the at least one processor is further configured to:
- group the set of hopping frequencies into the plurality of groups of hopping frequencies prior to configuring the UE for the CQI reporting.

42. The apparatus of claim 40, wherein hopping frequencies within each of the plurality of groups are continuous in a hopping pattern order for the set of hopping frequencies.

43. The apparatus of claim 42, wherein the hopping frequencies within each of the plurality of groups are discontinuous in physical frequency.

44. The apparatus of claim 40, wherein the CQI for the at least one group of the plurality of groups comprises a CQI value based on all measured hopping frequencies of a given group in the at least one group of the plurality of groups.

45. A non-transitory computer-readable medium storing computer executable code, comprising code to:
- configure a user equipment (UE) for channel quality indicator (CQI) reporting for a plurality of groups of hopping frequencies;
- receive a wideband CQI for each group of the plurality of groups of hopping frequencies and a sub-band CQI for at least a subset of hopping frequencies within at least one of the plurality of groups; and
- wherein a set of hopping frequencies comprising frequencies in an unlicensed spectrum is grouped into the plurality of groups.

46. The non-transitory computer-readable medium of claim 45, further comprising code to:
- group the set of hopping frequencies into the plurality of groups of hopping frequencies prior to configuring the UE for the CQI reporting.

* * * * *